United States Patent [19]
Praszek

[11] 3,991,803
[45] Nov. 16, 1976

[54] PNEUMATIC TIRE WITH REINFORCED TREAD

[75] Inventor: Jerome T. Praszek, Norton, Ohio

[73] Assignee: The B. F. Goodrich Company, Akron, Ohio

[22] Filed: Nov. 11, 1974

[21] Appl. No.: 522,701

[52] U.S. Cl. ............................. 152/361 R; 152/354
[51] Int. Cl.² ........................................... B60C 9/18
[58] Field of Search ............... 152/361 R, 355, 356, 152/354; 156/123, 128 I

[56] References Cited
UNITED STATES PATENTS

| | | | |
|---|---|---|---|
| 1,894,237 | 1/1933 | Mallory | 152/361 R |
| 2,958,359 | 11/1960 | Boussu et al. | 152/361 R |
| 3,130,769 | 4/1964 | Hindin et al. | 152/361 R |
| 3,294,143 | 12/1966 | Frazier | 156/128 I |
| 3,335,777 | 8/1967 | Hutch | 152/361 R |
| 3,342,239 | 9/1967 | Olagnier | 152/361 R |
| 3,516,465 | 6/1970 | Guyot | 152/361 R |
| 3,712,362 | 1/1973 | Alderfer | 152/361 R |

*Primary Examiner*—Drayton E. Hoffman
*Attorney, Agent, or Firm*—Harry F. Pepper, Jr.; W. A. Shira, Jr.

[57] ABSTRACT

A pneumatic tire comprises a tread portion reinforced with a layer of rubberized square-woven fabric which is applied as a narrow strip wound in a plurality of successive circumferential turns. Preferably this strip in certain of the turns is in an overlapping relationship with immediately preceding turns. This method of tread application is particularly advantageous in the retreading of high speed tires such as aircraft tires.

4 Claims, 3 Drawing Figures

PNEUMATIC TIRE WITH REINFORCED TREAD

BACKGROUND

This invention relates to pneumatic tires and in particular to pneumatic tires in which the tread portion thereof includes fabric reinforcement.

The tread portions of many pneumatic tires, belted or non-belted, are essentially free of fabric reinforcement. However, many of the so-called "high speed" pneumatic tires, such as, for example, aircraft tires, employ a layer of fabric or cords which reinforce the tread portions thereof. The advantages achieved by and typical details of such fabric reinforced tire treads are described in U.S. Pat. No. 2,943,663, assigned to the same assignee as the present invention.

The building of fabric reinforced tread portions is time consuming and tedious due to the fact that such tread portions comprise at least three distinct annular layers or zones each of which can require several building steps. Normally, such tread portions include a radially inner, circumferentially disposed "inner" or "under" tread layer or zone of essentially fabric-free elastomeric material, a radially intermediate circumferentially disposed layer of fabric-reinforced elastomeric material and a radially outer, circumferentially disposed "outer" tread layer of essentially fabric-free elastomeric material. Building of the radially intermediate layer is usually the most difficult because said layer is usually composed of one or more sheets or plies of rubberized fabric or cords, the widths thereof generally corresponding to the width of the outer and/or inner tread layer. When retreading these tires generally the same application steps are required as were required in building the original tread.

Because of the wide range of tire sizes which can require a reinforced tread portion, wide varieties of sizes of inner and outer tread layers as well as reinforcement layers must be available to a tire builder or retreader. This can represent inventory and storage problems as well as time consuming cutting and sizing of one or more of the components used.

In recent years these problems have been somewhat alleviated by what are generally termed "strip-treading" techniques in which cord-free tread portions or layers are formed by wrapping or winding a narrow strip of elastomeric material around the tire circumference in a plurality of overlapping turns. A typical description of this technique appears in U.S. Pat. No. 3,177,918.

When building fabric or cord reinforced tire tread portions, however, there still remains the necessity that the radially intermediate layer be formed by wrapping one or more specifically sized sheets of rubberized cord or fabric plies prior to forming at least the outer tread layer by strip winding.

There have been attempts at strip winding tread portions with cord reinforcement wherein one or more cords are put in an elastomeric strip and wound simultaneously with the strip on the tire to form the tread portion. (See, for example, U.S. Pat. No. 3,607,497).

Techniques such as this, however, do not permit a variation in the amount of fabric or cord used in a given reinforcement layer design because the design and amount of fabric or cord laid down is dictated by an already determined contour or amount of the outer tread layer material.

SUMMARY

It is an object of the present invention to provide an improved pneumatic tire having a fabric reinforced tread portion.

It is a further object to provide an improved technique for building a pneumatic tire with a fabric reinforced tread portion and particularly to provide a method of applying such tread portion to said tire.

It is a further object to provide a new, efficient and economical method of applying a tread portion to a pneumatic tire, which tread portion contains a layer or zone of fabric reinforcement.

These and other objects, which will be evident from the remaining description, are achieved by a pneumatic tire with a tread portion having a reinforced layer or zone comprising a narrow strip of rubberized square-woven fabric wound around the tire in a plurality of circumferential turns in which, preferably, said strip in at least one turn is in overlapping relationship with a preceding turn. Preferably, the strip is applied such that the weft strands in said square-woven fabric are substantially normal to the plane containing the circumferential centerline of the tire.

BRIEF DESCRIPTION OF THE DRAWINGS

The invention according to a presently preferred embodiment is shown in the accompanying drawings in which.

DESCRIPTION OF PRESENTLY PREFERRED EMBODIMENTS

Figure 1:
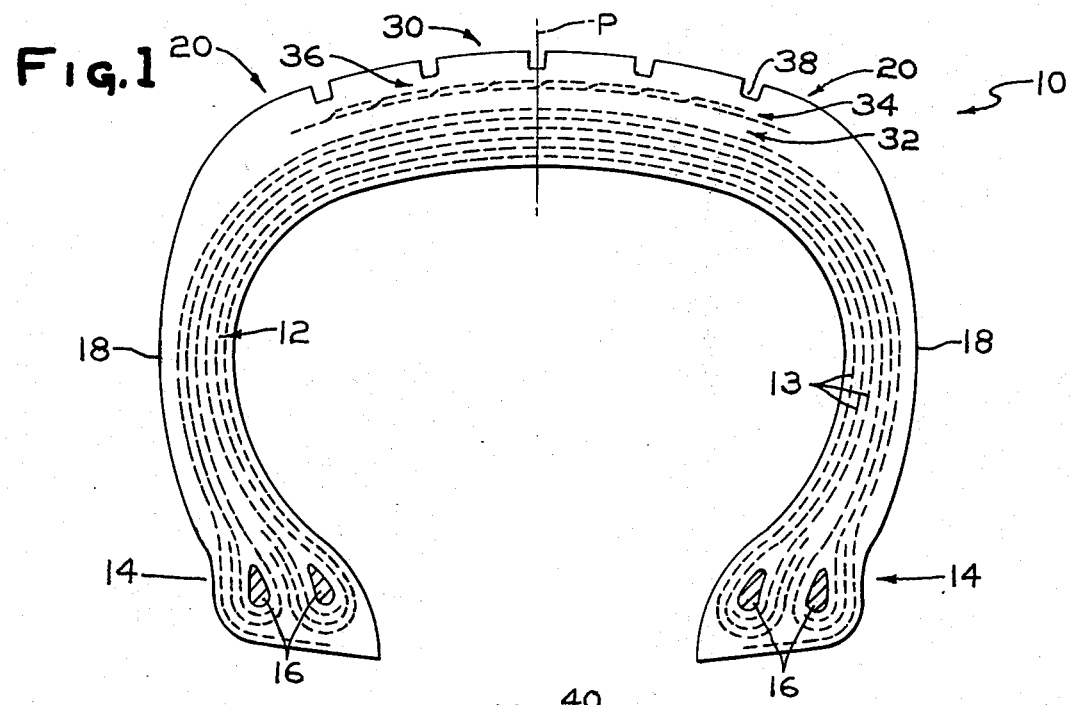
FIG. 1 shows a partial axial cross section of a pneumatic tire having a fabric reinforced tread portion according to the present invention.

The invention can be further described in terms of presently preferred embodiments and with reference to the several figures wherein like reference characters refer to like features or components.

In FIG. 1, a tire 10 is shown, which in several aspects is similar to a tire of the type disclosed in the aforementioned U.S. Pat. No. 2,943,663 assigned to the present assignee. The tire 10 typically includes a pair of spaced, annular bead portions 14 each incorporating a pair of rigid bead cores 16 which stiffen or rigidify bead portions 14 to maintain the tire sealed and seated on a rim (not shown). The tire 10 also includes a pair of annular sidewall portions 18 extending radially from the bead portions to axially spaced, annular shoulder portions or areas 20 of the tire 10. The basic framework or foundation of the tire 10 is provided by a carcass portion 12 composed of a selected number of sheets or plies 13 of rubberized cords. The bead, sidewall and carcass portions of tire 10 are shown for exemplary purposes only and the details thereof are of no particular criticality to the present invention.

The tire 10 also includes a tread portion 30, which in the tire of FIG. 1 is considered that portion of tire 10 extending both axially between shoulder portions 20 and radially inwardly to just above the radially outer section or "crown" of the outermost carcass ply 13.

The tread portion 30 is an example of a tread portion reinforced in accordance with the present invention and comprises three distinguishable circumferentially disposed elastomeric layers or zones, a radially inner essentially reinforcement-free elastomeric layer or zone 32, a radially intermediate fabric reinforced elastomeric layer or zone 34 and a radially outer essentially reinforcement free elastomeric layer or zone 36. Zone 32 is frequently termed the "inner tread" zone, zone 36 the "outer tread" zone, and fabric reinforced layer 34 the "reinforcement" zone. The outer and inner tread zones may comprise similar or dissimilar elastomers as desired. The outer tread zone usually includes an antiskid tread pattern on its outer surfaces which typically includes grooves such as 38. The reinforcement zone or fabric reinforced layer 34 of the exemplary tire 10 shown in FIG. 1, is in particular that to which the present invention pertains. Thus, although tire 10 pertains to a presently preferred embodiment of this invention, it is understood that the present invention is applicable to tires unlike tire 10 but which utilize reinforced tire tread portions similar to that shown in FIG. 1.

Figure 2:
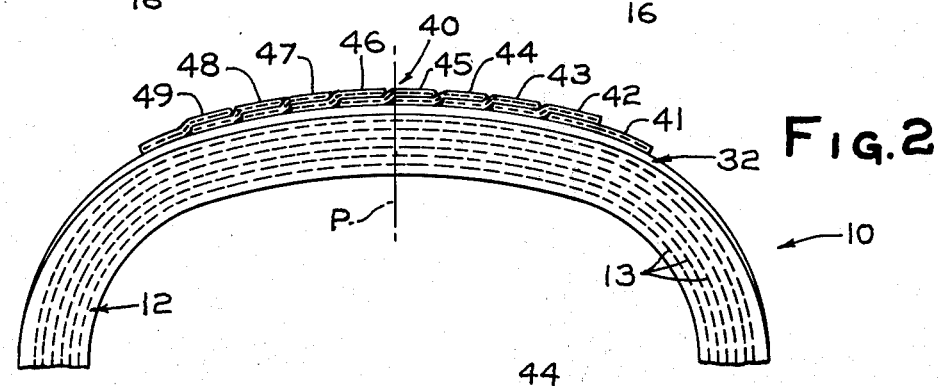
FIG. 2 is another partial axial cross section of a pneumatic tire similar to FIG. 1, showing the strip-wound fabric reinforced layer having been applied prior to application of the outer tread layer and curing.
Figure 3:
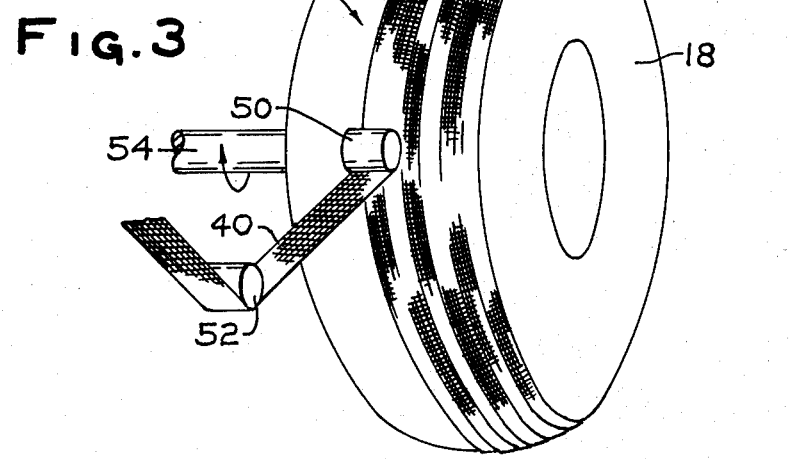
FIG. 3 illustrates in a generally schematic fashion the application of the fabric reinforced layer into the tread portion of a pneumatic tire in accordance with the present invention.

The details of reinforcement zone or layer 34 and the manner of forming same are made more evident with particular attention to FIGS. 2 and 3 which depict the tire 10 in various stages of a retreading operation. However, it is to be understood that the present invention, although particularly advantageous in and to retreading operations, is not limited thereto, but the principles of the invention where applicable can pertain to the building and or design of original or "new" reinforced tread portions.

In retreading a tire such as 10 the old or worn tread is removed and the tire prepared for reception of a "new" or retread portion. In FIG. 2, the tire 10 is represented as having been so prepared with annular unvulcanized inner tread layer 32 having been applied over the used carcass 13 in typical manner. In accordance with the invention and as shown in FIG. 2, the reinforcement zone or layer 34 is in the form of a strip 40, substantially narrower than the overall width of tread portion 30 wound continuously about the tire and over the under tread layer 32 in a predetermined number of circumferential turns, such number of turns being nine in FIG. 2. It is understood of course that the particular number of turns shown are exemplary only, and any number of turns may be used as desired. This strip 40 according to the present invention and as shown in FIG. 2 is composed of square-woven fabric preferably embedded within an unvulcanized elastomeric matrix. Such rubberized square-woven fabric is in itself a material commonly used in the tire industry, usually in sheet form and typically is composed of longitudinal or "warp" strands joined by transverse or "weft" strands in a woven pattern. The strands may be of natural or synthetic textile, glass, or metal fiber, as desired. The fabric strands are rubberized by suitable operations such as calendering uncured elastomeric material upon the woven pattern of strands. Although, as stated, the strip of square-woven fabric is preferably rubberized when applied, it is possible to apply on uncoated or non-rubberized strip of square-woven fabric. In this case, rubberization of the fabric can occur during cure.

As seen in FIGS. 2 and 3, the strip 40 is wound around the tire 10 over inner tread layer 32 in a plurality of turns 41 through 49 (from right to left in FIG. 2).

Each of the turns 42 through 49 are preferably in overlapping relationship with previous turns. As shown, first turn 41 lies essentially flat against under tread layer 32. By varying the amount of overlap between adjacent turns different fabric concentrations are possible throughout the axial extent of reinforcement zone 34. In the event of such variable concentrations of fabric, it is preferred that the concentrations are symmetrical with respect to the plane P and that one or more of the turns on either side of plane P overlap a preceding turn by selected widthwise amounts. More preferably, however, as shown in FIG. 2, each of turns 42 through 49 should overlap its respective preceding turn by selected width-wise amounts.

In applying strip 40, any known winding apparatus can be used which typically includes some type of applicator roll such as 50, with the strip 40 being drawn from a suitable source such as a storage roll (not shown). These devices also usually feature various arrangements of contact rollers including, for example, a slack or dancer roller 52. The tire 10 in FIG. 3 can be rotated by a shaft 54 in known fashion thereby pulling strip 40 from its supply roll or other strip supply source to pass under applicator roll 50. By known means, the entire applicator mechanism (not shown) is moved axially of the tire 10, from right to left in FIG. 3, in controlled increments, the speed and amount of such movement relative to the speed of rotation of tire 10 being controlled so as to vary desired degrees of turn by turn strip overlap.

As mentioned previously, the strip is preferably applied to the tire such that the weft strands are essentially normal to the plane P and the warp strands, therefore, essentially parallel to said plane. This feature is considered desirable so as to assure that the strip 40 maintains dimensional stability, particularly while being pulled on to rotating tire 10. Pulling strip 10 such that the weft strands will be disposed other than essentially normal to plane P could result in a reduction or "necking down" of strip 10 ahead of applicator roll 50.

As mentioned, this invention is believed particularly advantageous in retreading operations, because the entire retreading operation can be done by winding the inner, outer and reinforcement layers of the tread portion onto the tire thereby alleviating many of the problems in retreading a tire with a fabric or cord reinforced tread.

Tires having a strip wound intermediate layer of square-woven fabric in the tread portion thereof are also considered superior in certain respects to tires with intermediate tread reinforcement layers comprising hand laid or wrapped, sized sheets of cord reinforced elastomeric plies. Because the winding of rubberized square-woven fabric as described is easily automated, there is less chance of builder error and thus a more uniform reinforcement zone results. Also, because square-woven fabric typically employs fine gauge strands, for equal amounts by weight of fabric in the reinforcement zone, higher strengths are usually possible using a wound square-woven fabric strip. Conversely, for strengths equal to that supplied by the usual cord reinforced plies, lesser amounts by weight are possible when using wound square-woven strip as the reinforcing layer in a fabric reinforced strip.

Although the foregoing described the present invention as principally relating to a retreaded tire and/or retreading operation, it is evident the present invention can relate to original or new tire constructions, particularly when the tire is built in its unvulcanized or "green" state using stages or steps wherein the green tire is expanded to essentially its finished toroidal profile prior to application of its tread portion. Such stages are common in the manufacture of certain types of radial tires.

Although the foregoing describes the present invention as it relates to certain specifically preferred embodiments, it is evident that many obvious modifications and departures therefrom are to be considered within the scope of the present invention which scope is to be measured by the appended claims.

I claim:

1. In a method of forming the tread portion of a pneumatic tire which method includes applying to the circumference of the tire a radially inner, circumferentially disposed layer of essentially fabric-free elastomeric material, a radially intermediate, circumferentially disposed layer of fabric reinforced elastomeric material and a radially outer, circumferentially disposed layer of fabric-free elastomeric material, the improvement comprising applying said radially intermediate layer by continuously winding a single narrow strip of square-woven fabric in a predetermined number of successive circumferential turns such that the weft strands of said fabric are disposed substantially normal relative to the plane containing the circumferential centerline of said tire and a widthwise portion of said strip in each of a selected number of said turns overlaps a widthwise portion of said strip in an immediately preceding turn.

2. The method of claim 1 wherein said selected number of turns consists of all turns except the first turn.

3. In a pneumatic tire having a tread portion comprising a radially inner layer of elastomeric material, which is essentially free of fabric reinforcement a radially intermediate layer of fabric reinforced elastomeric material and a radially outer layer of elastomeric material which is essentially free of fabric reinforcement, the improvement wherein said radially intermediate layer of fabric reinforced elastomeric material comprises a single narrow strip of square-woven fabric continuously wound in a plurality of turns over said radially inner layer of elastomeric material such that the weft strands in said square-woven fabric are disposed substantially normal relative to the plane containing the circumferential centerline of said tire and a widthwise portion of the strip in each of a selected number of said turns overlaps a widthwise portion of said strip in an immediately preceding turn.

4. The pneumatic tire recited in claim 3 wherein said selected number of turns consists of all turns except the first turn.

* * * * *